(12) United States Patent
Schlein

(10) Patent No.: US 6,186,156 B1
(45) Date of Patent: Feb. 13, 2001

(54) CLEANING DEVICE

(75) Inventor: Rolf-Dieter Schlein, Rotenburg (DE)

(73) Assignee: Mannesmann VDO AG (DE)

( * ) Notice: Under 35 U.S.C. 154(b), the term of this patent shall be extended for 0 days.

(21) Appl. No.: 09/300,821

(22) Filed: Apr. 27, 1999

(30) Foreign Application Priority Data

May 9, 1998 (DE) .............................. 198 20 897

(51) Int. Cl.⁷ ....................................... B08B 3/02
(52) U.S. Cl. .................. 134/105; 134/123; 134/198; 239/284.2
(58) Field of Search .................... 134/123, 105, 134/172, 198; 239/284.1, 284.2

(56) References Cited

U.S. PATENT DOCUMENTS

| | | | |
|---|---|---|---|
| 3,609,450 | * | 9/1971 | Hart . |
| 3,632,042 | * | 1/1972 | Goulish . |
| 3,656,691 | * | 4/1972 | Norstrand . |
| 3,658,074 | * | 4/1972 | Wright ................... 134/123 |
| 4,088,269 | * | 5/1978 | Schlick . |
| 4,177,928 | * | 12/1979 | Bergkvist . |
| 4,187,868 | * | 2/1980 | Ruolphi ................... 134/123 |
| 4,324,363 | * | 4/1982 | Rauen, Jr. . |
| 4,604,946 | * | 8/1986 | Watanabe . |
| 4,752,032 | * | 6/1988 | Costa et al. . |
| 4,865,059 | * | 9/1989 | Leleve . |
| 4,955,543 | * | 9/1990 | Orth et al. . |
| 5,269,464 | * | 12/1993 | Epple et al. . |
| 5,354,965 | * | 10/1994 | Lee . |
| 5,546,630 | * | 8/1996 | Long . |
| 5,749,525 | * | 5/1998 | Stouffer . |
| 6,029,908 | * | 2/2000 | Petzold . |

FOREIGN PATENT DOCUMENTS

| | | |
|---|---|---|
| 0724994 | 9/1995 | (EP) . |
| 2681031 | 6/1991 | (FR) . |

* cited by examiner

Primary Examiner—Frankie L. Stinson
(74) Attorney, Agent, or Firm—Mayer Brown & Platt

(57) ABSTRACT

In the case of a cleaning device (1) a washer jet (9) is arranged on a piston rod (6) which can be moved by means of an electromotive drive unit (3). A heating element (10), which is connected to a hollow cylinder (2) which is in a fixed location, is situated, in its illustrated position of rest, in the direct vicinity of the washer jet (9) and in this manner makes it possible for the washer jet (9) to be heated thereby preventing it from freezing up when ambient temperatures are critical. No electrical contacts are required on the moveable part of the cleaning device (1) because of the connection of the heating element (10) in a fixed location.

12 Claims, 1 Drawing Sheet

CLEANING DEVICE

BACKGROUND OF THE INVENTION

The invention relates to a cleaning device for a motor vehicle lens glass, in particular a motor vehicle lamp lens, having a washer jet which can be heated by means of a heating element, is provided for spraying the lens glass with washer fluid and is arranged such that it can be moved from a position of rest into an operating position.

Cleaning devices of this type are often used in today's motor vehicles for motor vehicle lamps in the form of front headlamps, and in practice are known. The washer jet is generally arranged in a fender in front of the lens glass and can be moved, by means of an axially displaceable piston, from a position of rest recessed in the contour of the motor vehicle into a position which protrudes with respect to the contour of the fender.

In the case of cleaning devices of this type, similarly to the case of immovable washer jets for cleaning the motor vehicle's windshield, there is the problem that the washer jet tends to freeze up when there is frost. In order to prevent this the washer jet is heated electrically in the case of known cleaning devices. For this purpose, the heating element is actuated by a control element, when the temperature falls below a critical ambient temperature, and thereby prevents the jet from freezing up. A disadvantage in this case is the relatively elaborate and wear-susceptible contacting of the electrically heatable washer jet. The contacting takes place, for example via flexible wires or sliding contacts which are easily damaged in the motor vehicle fender region, which is particularly frequently subjected to stress, and can result in the cleaning device malfunctioning.

BRIEF SUMMARY OF THE INVENTION

The invention is based on the problem of equipping a cleaning device of the type mentioned at the beginning with a heating element without a flexible, electrical contact being required for this purpose on the washer jet which can be moved from a position of rest into an operating position.

According to the invention, this problem is solved in that the heating element is positioned in a fixed location in the direct vicinity to the washer jet situated in the position of rest. By this means, the heating element can be arranged on an immovable part of the cleaning device and therefore does not require any electrical contacting compensating for the movement of the washer jet. Since the heating element lies in the direct vicinity of the washer jet in the position of rest of the washer jet, heating of the washer jet is possible without any problem so that the washer jet is reliably prevented from freezing up. While the washer jet is in the extended operating position, the heating element and the washer jet are at a distance from one another. This is insignificant because of the merely relatively short period of time in which the washer jet is situated in its operating position. Freezing up is virtually ruled out while the washer jet is in its operating position because the cleaning fluid is then flowing. The heating element can be arranged relatively easily on the cleaning device which is know per se.

The heating element can also be arranged retrospectively in the case of known cleaning devices in a particularly simple manner if the heating element is designed for heating the washer jet by heat radiation.

In this case, an embodiment of the invention is particularly advantageous in which the heating element is arranged on an element of the vehicle body. As a result, no structural changes are required to a conventional, unheated cleaning device. In this case, the heating element can be arranged without a great outlay on a support which holds the cleaning device. Extensive pre-assembly of the heating element, for example in the interior of a fender, is possible in this case. Furthermore, exchange of the heating element in the event of the cleaning device being damaged can be omitted as a result. In addition, there is the possibility of retrofitting the heating element in existing cleaning devices.

An embodiment of the invention is particularly favourable in this case in which the heating element has an electrical resistance element. Heating elements of this type make simple installation possible and have a relatively small overall height. They are therefore also suitable for use in comparatively unfavourable space conditions. Furthermore, the electrical resistance element can be designed such that it can be regulated by means of a control element which detects the outside temperature. The temperature sensors required for this purpose frequently already exist in today's vehicles and so the activating means of the resistance element can be integrated without a problem into the control unit.

A development of the invention is particularly appropriate in this case in which the heating element has a PTC element. Such a PTC element (Positive Temperature Coefficient), which is also known as PTC resistor, does not require any additional control element since the electrical resistance of the PTC element is dependent on temperature and therefore additional detection of the outside temperature is not required. As a result, easy retrofitting of the heating element, in particular also in motor vehicles which do not have a temperature sensor, is possible.

A development of the invention is also advantageous in which the heating element has a heat conducting element transmitting the waste heat from the motor vehicle engine. This heat conducting element is, for example, directly connected to the engine and can thus use the waste heat being produced at the engine for heating the washer jet. In this case, no electrical contacts of any type are required for the heating element and, in contrast to an electrically operated heating element, an additional consumption of energy does not arise.

In this case, an embodiment of the invention is particularly well suited in which the heating element is a heat exchanger which uses the heat energy from the engine cooling water. For this purpose, the heating element can be directly connected into the cooling water circuit by means of a hose connection and thus makes it possible for the heat energy which is present to be used without a problem. The use of flexible hose pipes also makes it possible for positions which are not easily accessible on the motor vehicle to be reached.

In a particularly effective development of the invention in which the heating element is designed such that it can be placed against the washer jet in the position of rest thereof, the losses which arise during the transfer of the heat from the heating element to the washer jet can be reduced. The heating element efficiency which is improved in this case enables a heating element of lower heating power to be used with the power being unchanged. As a result, savings in energy can be achieved and more cost-efficient heating elements used.

Another advantageous embodiment of the invention can also be achieved in that the heating element is switched off in the operating position of the washer jet. In the operating position of the washer jet the latter is at a relatively great distance from the heating element so that the heating element is ineffective. By switching off the heating element, unnecessary consumption of energy and hence cost can therefore be avoided.

For this purpose a development is particularly well suited in which the contacting of the heating element is interrupted in the operating position of the washer jet. A separate control element which initially detects the operating state and, if appropriate, interrupts the supply of energy to the heating element, if the washer jet is situated in the operating position, is therefore unnecessary. This can be done, for example, by means of contact pins which produce an electrical contact in the retracted position of rest of the washer jet and interrupt the contacting in the extended operating position.

The washer jet could be designed such that it can be moved by means of the fluid pressure of the washer fluid. In contrast, a particularly advantageous embodiment of the invention is achieved if the washer jet can be moved by means of an electric motor. It is thereby possible initially to move the washer jet into the desired operating position and subsequently to trigger the flow of washer fluid. As a result, only the amount of washer fluid required for cleaning is used, the amount of washer fluid missing the lens glass being insignificant. Furthermore, the leakage of excess washer fluid after the washing process is finished, which leakage is irritating and is caused by the design in the case of cleaning devices operated by means of fluid pressure, is avoided.

The cleaning device according to the invention enables a relatively large lens glass to be cleaned without after-wiping if the washer jet is designed as a fluidic jet. Washer jets designed as a fluidic jet produce a washer fluid spray which swings to and fro cyclically and has a particularly small cross section. By means of the washer fluid spray swinging to and fro it is possible for a strip-shaped region, for example, of the lens glass to be wetted with washer fluid. In this case, the washer fluid spray has a very high pressure so that dirt adhering to the lens glass is rinsed away. These washer jets have oval or strip-shaped spraying regions which can be put together in a simple manner to form a large spraying region.

BRIEF DESCRIPTION OF THE DRAWINGS

The invention permits various embodiments. To further clarify its basic principle two of these are illustrated in the drawing and are described in the following. In the drawing

DETAILED DESCRIPTION OF THE INVENTION

Figures 1, 2:
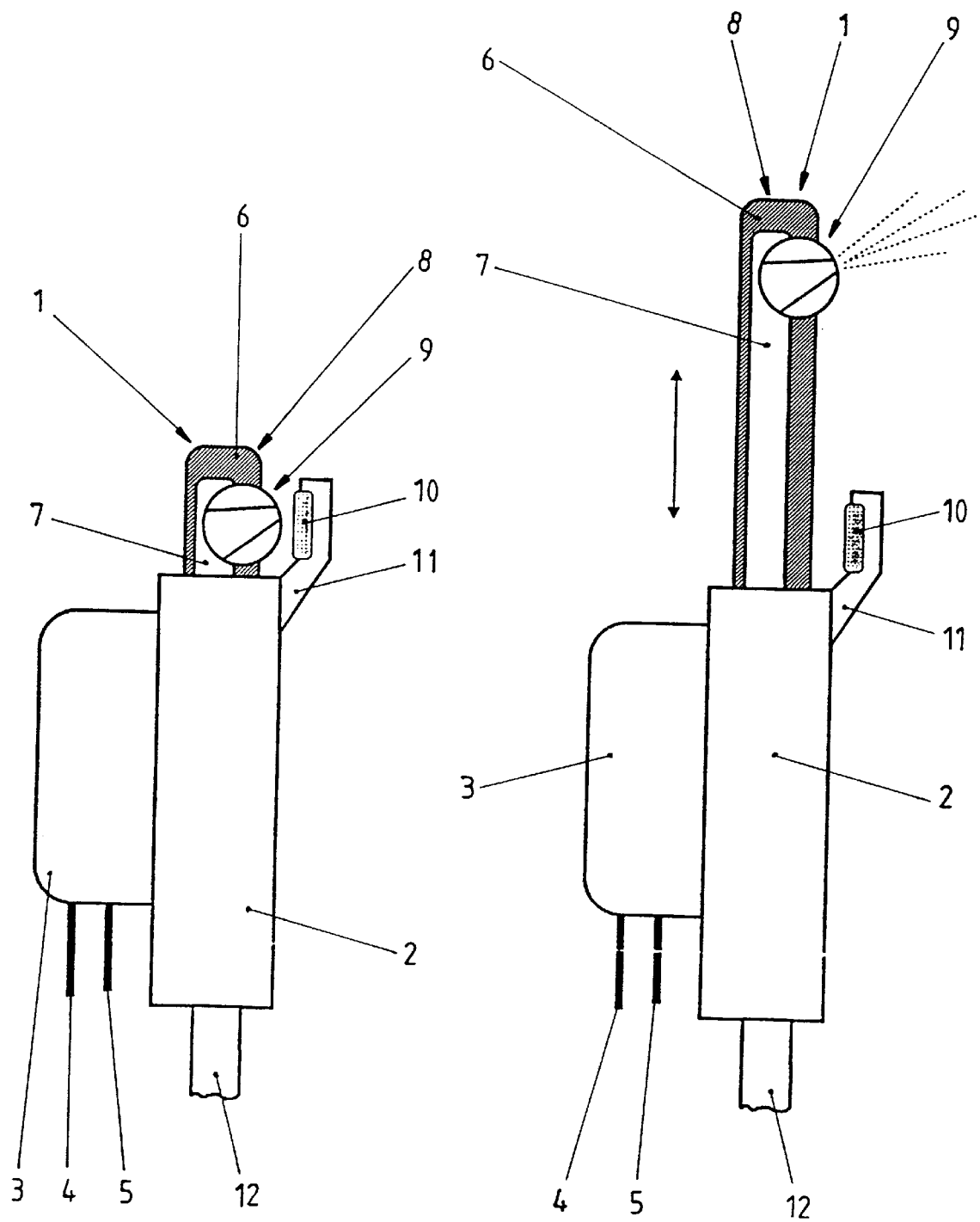
FIG. 1 shows a lateral, partially cut-away illustration of a cleaning device according to the invention in a position of rest.
FIG. 2 shows the cleaning device in an operating position.

FIG. 1 shows a cleaning device 1 according to the invention in a retracted position of rest. The cleaning device 1 has a hollow cylinder 2 having an electromotive drive unit 3 which is provided on its underside with two electrical contacts 4, 5. In the position of rest illustrated, the hollow cylinder 2 has inserted in it a piston rod 6 which is designed as a push rod, is illustrated cut-away and in the interior of which there is arranged a washer fluid duct 7. On an upper end section of the piston rod 6, which is designed as a jet rim 8, said piston rod has a washer jet 9 which is of spherical design and is arranged in a moveable manner. The washer jet 9 is connected to the washer fluid duct 7 and makes individual alignment possible for setting the optimum spraying angle. In the position of rest illustrated, the washer jet 9 is situated in the direct vicinity of a heating element 10 which is connected to the hollow cylinder 2 by means of a housing 11. For supplying the cleaning device 1 with washer fluid, the hollow cylinder 2 is connected on its underside to a washer fluid pipe 12 which is only illustrated sectionally.

FIG. 2 shows the cleaning device 1 in an operating position in which the piston rod 6 is extended with respect to the immoveable heating element 10 out of the hollow cylinder 2 by means of the drive unit 3. The emergence of washer fluid from the washer jet 9, which is connected to the washer fluid duct 7, is indicated. In this position, the jet rim 8 can protrude outward, for example, through an opening (not illustrated) in a fender and in this manner come into a favourable position for cleaning the lens glass. The connection of the electrical contacts 4, 5, which connection is interrupted in the operating position and prevents the heating element 10 from unnecessarily being supplied with energy in the operating position, is likewise not illustrated.

We claim:

1. A cleaning device for a motor vehicle lens glass, in particular a motor vehicle lamp lens, having a washer jet which can be heated by means of a heating element, is provided for spraying the lens glass with washer fluid and is arranged such that it can be moved from a position of rest into an operating position, wherein the heating element (10) is positioned in a fixed location in the direct vicinity to the washer jet (9) situated in the position of rest.

2. The cleaning device as claimed in claim 1, wherein the heating element (10) is designed for heating the washer jet (9) by heat radiation.

3. The cleaning device as claimed in claim 2, wherein the heating element, (10) is arranged on an element of the vehicle body.

4. The cleaning device as claimed in at least one of the preceding claims, wherein the heating element (10) has an electrical resistance element.

5. The cleaning device as claimed in claim 4, wherein the heating element (10) has a PTC element.

6. The cleaning device as claimed in claim 4, wherein the heating element (10) has a heat conducting element transmitting the waste heat from the motor vehicle engine.

7. The cleaning device as claimed in claim 6, wherein the heating element (10) has a heat exchanger which uses the heat energy from the engine cooling water.

8. The cleaning device as claimed in claim 7, wherein the heating element (10) is designed such that it can be placed against the washer jet (9) in the position of rest thereof.

9. The cleaning device as claimed in claim 1, wherein the heating element (10) is switched off in the operating position of the washer jet (9).

10. The cleaning device as claimed in claim 9, wherein the contacting of the heating element (10) is interrupted in the operating position of the washer jet (9).

11. The cleaning device as claimed in claim 1, wherein the washer jet (9) can be moved by means of an electric motor.

12. The cleaning devices claimed in claim 1, wherein the washer jet (9) is designed as a fluidic jet.

* * * * *